US012785736B2

(12) United States Patent
Zhao et al.

(10) Patent No.: US 12,785,736 B2
(45) Date of Patent: Nov. 3, 2026

(54) SIGNAL PROCESSING METHOD, STORAGE MEDIUM, INTEGRATED CIRCUIT, DEVICE AND TERMINAL

(71) Applicant: CALTERAH SEMICONDUCTOR TECHNOLOGY (SHANGHAI) CO., LTD., Shanghai (CN)

(72) Inventors: Qiyong Zhao, Shanghai (CN); Jiashu Chen, Shanghai (CN); Yan Zhu, Shanghai (CN); Xiaolong Zhang, Shanghai (CN)

(73) Assignee: Calterah Semiconductor Technology (Shanghai) Co., Ltd., Shanghai (CN)

(*) Notice: Subject to any disclaimer, the term of this patent is extended or adjusted under 35 U.S.C. 154(b) by 376 days.

(21) Appl. No.: 18/401,252

(22) Filed: Dec. 29, 2023

(65) Prior Publication Data

US 2024/0137055 A1 Apr. 25, 2024
US 2024/0235590 A9 Jul. 11, 2024

Related U.S. Application Data

(63) Continuation of application No. PCT/CN2023/101095, filed on Jun. 19, 2023.

(30) Foreign Application Priority Data

Sep. 22, 2022 (CN) ......................... 202211160667.9
Sep. 23, 2022 (CN) ......................... 202211166367.1
Oct. 14, 2022 (CN) ......................... 202211262317.3

(51) Int. Cl.
*H04B 15/02* (2006.01)
*G01S 13/88* (2006.01)
(Continued)

(52) U.S. Cl.
CPC .......... *H04B 1/0475* (2013.01); *G01S 13/886* (2013.01); *H04B 1/1027* (2013.01)

(58) Field of Classification Search
CPC ...... H04B 1/0475; H04B 1/1027; H04B 1/10; H04B 1/7097; H04B 1/715; H04B 1/719;
(Continued)

(56) References Cited

U.S. PATENT DOCUMENTS 10,103,760 B1 * 10/2018 Yang .................... H04J 11/0066
2011/0267219 A1 11/2011 Kisliansky et al.
(Continued)

FOREIGN PATENT DOCUMENTS

CA 2271154 A1 4/1999
CN 104793211 A 7/2015
(Continued)

OTHER PUBLICATIONS

Calterah Semiconductor Technology (Shanghai) Co., Ltd., Partial Supplementary European Search Report, EP23825361.1, Oct. 30, 2025, 27pgs.

(Continued)

*Primary Examiner* — Andrew Wendell
(74) *Attorney, Agent, or Firm* — USCH Law, PC

(57) ABSTRACT

The present disclosure provides a signal processing method, a storage medium, an integrated circuit, a device, and a terminal. The method is applied to perform interference detection and/or constant false alarm detection on signal units of a discrete signal to be detected, and includes: obtaining, for any signal unit, a signal statistical characteristic value of a respective discrete point in the signal unit; determining, based on the signal statistical characteristic value of the respective discrete point, a detection threshold for the signal unit; and, based on the detection threshold, performing constant false alarm detection, and/or, determin-
(Continued)

ing whether the respective discrete point is subject to interference.

21 Claims, 7 Drawing Sheets

(51) Int. Cl.
*H04B 1/04* (2006.01)
*H04B 1/10* (2006.01)

(58) Field of Classification Search
CPC ....... H04B 15/02; G01S 13/886; G01S 7/356; G01S 2013/9323; G01S 7/023; G01S 7/2927; G01S 7/354; G01S 13/343; G01S 13/931; G01S 17/931
See application file for complete search history.

(56) References Cited

U.S. PATENT DOCUMENTS

| | | | |
|---|---|---|---|
| 2021/0149042 A1 | 5/2021 | Wennersten et al. | |
| 2021/0278496 A1 | 9/2021 | Li et al. | |
| 2022/0018933 A1 | 1/2022 | Nugraha et al. | |
| 2022/0163651 A1* | 5/2022 | Bengtsson | G01S 13/48 |
| 2024/0172137 A1* | 5/2024 | Han | H04B 17/328 |

FOREIGN PATENT DOCUMENTS

| | | | | |
|---|---|---|---|---|
| CN | 109633597 A | 4/2019 | | |
| CN | 109669161 A | 4/2019 | | |
| CN | 110068839 A | 7/2019 | | |
| CN | 108089166 B | 6/2020 | | |
| CN | 111352102 A | 6/2020 | | |
| CN | 111832537 A | * | 10/2020 | G06K 9/00 |
| CN | 112462337 A | 3/2021 | | |
| CN | 112698277 A | 4/2021 | | |
| CN | 113302511 A | 8/2021 | | |
| CN | 113484836 A | 10/2021 | | |
| CN | 113589268 A | * | 11/2021 | G01S 13/04 |
| CN | 114660585 A | 6/2022 | | |
| CN | 114966566 A | 8/2022 | | |
| EP | 1672379 B1 | 8/2012 | | |
| EP | 3770628 A1 | 1/2021 | | |
| KR | 20190000565 A | 1/2019 | | |
| WO | 2021217795 A1 | 11/2021 | | |

OTHER PUBLICATIONS

G. V. Weinberg et al., An Introduction to Radar Sliding Window Detectors, Introduction to Radar Sliding Window Detectors, Sep. 29, 2017, 7 pgs.

Calterah Semiconductor Technology (Shanghai) Co., Ltd., The extended European search report, EP23825361.1, Feb. 17, 2026, 35 pgs.

Calterah Semiconductor Technology (Shanghai) Co., Ltd., CN First Office Action with English translation, CN2022112623173, Apr. 10, 2026, 30 pgs.

* cited by examiner

SIGNAL PROCESSING METHOD, STORAGE MEDIUM, INTEGRATED CIRCUIT, DEVICE AND TERMINAL

CROSS REFERENCE TO RELATED APPLICATIONS

This application is a continuation of PCT Patent Application No. PCT/CN2023/101095, filed Jun. 19, 2023, which claims priorities to Chinese Patent Application No. CN202211160667.9, filed on Sep. 22, 2022, Chinese Patent Application No. CN202211166367.1, filed on Sep. 23, 2022, and Chinese Patent Application No. CN202211262317.3, filed on Oct. 14, 2022, each of which is incorporated by reference herein in its entirety.

TECHNICAL FIELD

The various embodiments described in this document relate in general to the field of signal processing technology, and more specifically to a signal processing method, a storage medium, an integrated circuit, a device and a terminal.

BACKGROUND

Radar is a device that uses electromagnetic wave signals to detect targets, and has a wide range of applications in the field of military command With the development of radar technology, the cost of radar is getting lower and lower, and the volume of radar is getting smaller and smaller. Radar has gradually become an indispensable piece of technology in the daily life of mankind, and automobiles, airplanes, ships, and even unit phones can be equipped with radar. In-vehicle radar is one of the most successful representatives of civilian radars. The in-vehicle radar can help vehicles to complete tasks such as finding obstacles, predicting collisions and adaptive cruise control. However, with the increasing number of automobiles and the popularization of in-vehicle radar, signal interference between various in-vehicle radar has become more and more serious. The signal interference between radars includes cross-interference and parallel interference. The cross-interference may increase the background noise, resulting in that weaker target signals cannot be detected, while the parallel interference may lead to false alarm phenomenon.

Therefore, it is very important to solve the problem of signal interference. And in order to solve the signal interference problem, it is first necessary to detect whether signal interference has occurred. At present, signal interference detection is generally based on factors such as changes in signal amplitude and periodicity of signal amplitude changes. However, in practical applications, it is difficult to accurately predict signal magnitude and the changes in signal amplitude. Interference signals cannot be detected when they are weak, while the periodicity of signal amplitude changes is prone to be affected by noise, thus the accuracy of signal interference detection is low.

SUMMARY

Embodiments of the present disclosure provide a signal processing method, a storage medium, an integrated circuit, a device, and a terminal, which, by employing signal statistical characteristic to implement signal interference detection, is less affected by a local mutation of the signal, thereby effectively improving the efficiency and accuracy of processing such as signal interference detection and constant false alarm detection, and at the same time reducing the false alarm rate of the detection.

Embodiments of the present disclosure provide a signal processing method, which may be applied to performing operations such as interference detection and/or constant false alarm detection on signal units of a discrete signal to be detected. The method may include the following operations: obtaining, with respect to a respective signal unit of the signal units, a signal statistical characteristic value of a respective discrete point in the respective signal unit; determining, based on the signal statistical characteristic value of the respective discrete point, a detection threshold of the respective signal unit; based on the detection threshold, performing constant false alarm detection, and/or, determining whether the respective discrete point is subject to interference.

Embodiments of the present disclosure further provide a computer-readable storage medium storing a computer program, and the computer program, when executed by a processor, causes the processor to implement the signal processing method in the embodiments of the present disclosure.

Embodiments of the present disclosure further provide an integrated circuit, including: a signal transceiver channel, configured to transmit radio signals and receive echo signals formed by the radio signals being reflected by a target, and a signal processing module, configured to perform signal processing based on the above signal processing method. The signal processing module includes an interference detection module and a constant false alarm detection module. The interference detection module is configured to perform signal interference detection based on the above signal processing method, and the constant false alarm detection module is configured to perform constant false alarm detection based on the above signal processing method.

It should be noted that, when the interference detection module and the constant false alarm detection module are integrated in an integrated circuit, for an echo signal unit, processing such as interference detection, interference processing (e.g. conventional interference processing performed with respect to detected signal subjected to interference, or zeroing performed with respect to signal subjected to interference and re-generating a corresponding signal by interpolating or fitting performed based on remaining signals not subjected to interference to supplement the zeroed signal), constant false alarm detection, and the like, may be performed in sequence, or may be performed separately, and alternatively the aforementioned interference detection, interference processing, and constant false alarm detection may be carried out with respect to different echo signal units at the same time. At the same time, hardware such as a statistical characteristic value calculation unit and a threshold calculation unit may be partially or completely shared to improve the integration degree, or the hardware structure may be set up separately according to the demand to improve the overall signal processing efficiency.

Embodiments of the present application further provide a radio device including: a carrier; an integrated circuit as described above, disposed on the carrier; and an antenna, disposed on the carrier, for transmitting and receiving radio signals.

Embodiments of the present application also provide a terminal including: a device body; and a radio device as described above disposed on the device body, the radio device being used for target detection and/or communication.

The signal processing method, the storage medium, the integrated circuit, the device and the terminal in accordance with the embodiments of the present disclosure, are applied to perform interference detection on signal units in a discrete signal to be detected. For any signal unit, a signal statistical characteristic value of a respective discrete point in the signal unit is obtained, then a detection threshold of the signal unit is determined based on the signal statistical characteristic value of the respective discrete point, and finally, based on the detection threshold, whether the respective discrete point is subjected to interference is determined, or constant false alarm rate (CFAR) detection is performed. Considering that signal interference detection based on factors such as changes in signal amplitude, periodicity of signal amplitude changes, etc., is easily affected by noise and the accuracy of interference detection is low, whereas in the embodiments of the present disclosure, interference detection or constant false alarm detection is performed on signal units in discrete signals to be detected, i.e., signal interference detection is carried out at the ADC threshold or the DSP threshold, so as to identify or dealing with the interference occurred as early as possible, to reduce the impact on subsequent applications. By obtaining the statistical characteristics of the signal unit, from the signal unit as a whole, a scientific, reasonable, targeted detection threshold is determined, and such signal interference detection process is less affected by the signal local mutation and noise, effectively improving the efficiency and accuracy of signal interference detection, and reducing the false alarm rate of signal interference detection. At the same time, for a discrete signal that is determined to be not subjected to interference by the interference detection, or for a discrete signal that is determined to be subjected to interference by the interference detection and is subjected to interference elimination processing, or for a discrete signal that is obtained by performing discrete spectrum analysis processing, such as any one or any combination of a distance-dimensional FFT, a velocity-dimensional FFT and an angle-dimensional FFT, directly on a discrete signal that is not subjected to the interference detection, on the basis of the same ideas, that is, the false alarm detection threshold of the respective signal unit is determined based on the signal statistical characteristic value, and constant false alarm detection can be performed based on the false alarm detection threshold for accurate target detection.

In some embodiments, when the signal processing method in the embodiments of the present disclosure is used to perform interference detection on the signal unit in the discrete signal to be detected, the discrete signal to be detected may be a signal at an ADC threshold, at a DSP threshold or the like, whereas when the signal processing method in the embodiments of the present disclosure is used to perform constant false alarm detection on the signal unit in the discrete signal to be detected, the discrete signal to be detected may be a discrete signal that is obtained by processing of discrete spectrum analysis such as a range-dimensional FFT and/or a velocity-dimensional FFT and/or an angle-dimensional FFT, and the like.

In some embodiments, obtaining, with respect to any signal unit, the signal statistical characteristic value of the respective discrete point in the signal unit, includes: obtaining a differential sequence corresponding to the signal unit based on a signal amplitude value of the respective discrete point, and obtaining the signal statistical characteristic value of the respective discrete point in the signal unit based on the differential sequence. The differential sequence can well reflect the changes between the signal amplitudes of the discrete points, has a strong anti-interference capability, facilitates more accurate determination of the statistical characteristics of the discrete points in the signal unit, and thus more accurately determines which of the discrete points have been subjected to interference.

In some embodiments, obtaining the differential sequence corresponding to the signal unit based on the signal amplitude value of the respective discrete point includes: traversing discrete points and obtaining a signal amplitude difference between a current discrete point and a discrete point adjacent to the current discrete point as a differential value of the current discrete point; and obtaining the differential sequence based on the differential value of the respective discrete point.

In some embodiments, the signal processing method further includes: performing interpolating at an end of a sequence of discrete points to add a virtual discrete point; and obtaining the differential value of discrete points at the end by using a signal amplitude value of the virtual discrete point. Considering that the differential value corresponding to the discrete point at the end of the signal unit cannot be obtained by performing calculation because there is no adjacent discrete point in front of or behind it, in this embodiment, a value is interpolated at outside of the end of a sequence of discrete points to generate a virtual discrete point, so as to ensure that the differential value can be obtained for each of the discrete points.

In some embodiments, obtaining the signal statistical characteristic value of the respective discrete point in the signal unit based on the differential sequence includes: obtaining the signal statistical characteristic value of the respective discrete point in the signal unit based on a signal statistical characteristic presented by differential values of at least part of the discrete points in the differential sequence, using an order moment as a statistical variable. The order moments can well reflect the global property of a set of data, and the order moment is used as a tool to count the signal statistical characteristics presented by the differential values of some discrete points, so that the signal statistical characteristic values of the respective discrete point can be obtained more accurately.

In some embodiments, the order moment is an N-order moment such as first-order moment or second-order moment, and N is an integer greater than 0.

In some embodiments, obtaining the signal statistical characteristic value of the respective discrete point in the signal unit based on the signal statistical characteristic presented by differential values of at least part of the discrete points in the differential sequence, using the order moment as the statistical variable, includes: traversing discrete points and obtaining the signal statistical characteristic value of a current discrete point according to differential values of at least one discrete point prior to the current discrete point, using the order moment as the statistical variable; where in response to the current discrete point being the first discrete point in the signal unit, differential values of at least one third virtual discrete point by means of pre-interpolating or linear fitting are obtained, and a signal statistical characteristic value of the first discrete point is obtained based on the differential values of the at least one third virtual discrete point, using the order moment as the statistical variable. Considering that there is no other discrete point ahead of the first discrete point, the differential value of at least one virtual discrete point is generated for the first discrete point by means of interpolation or linear fitting, so as to ensure that the signal statistical characteristic value of the first discrete point can be obtained.

In some embodiments, the signal statistical characteristic value of the respective discrete point is obtained based on a sliding window. Considering that the signal is subject to certain variations, the method of sliding window statistics is adopted to obtain the signal statistical characteristic value of the respective discrete point, so as to weaken the noise as much as possible, thus avoiding that the process of detecting the signal interference from being affected by the noise.

In some embodiments, the sliding window has a length of L, L being an integer greater than 1, and obtaining the signal statistical characteristic value of the respective discrete point based on the sliding window includes: traversing discrete points, and obtaining the signal statistical characteristic value of the current discrete point based on differential values of L discrete points prior to the current discrete point; or, obtaining the signal statistical characteristic value of the current discrete point based on differential values of L discrete points selected with the current discrete point as a center.

In some embodiments, in response to obtaining the signal statistical characteristic value of the current discrete point based on the differential values of the L discrete points selected with the current discrete point as the center, and in response to the current discrete point being the last discrete point in the signal unit, differential values of at least one fourth virtual discrete point are obtained by means of post-interpolating or linear fitting to obtain the signal statistical characteristic value of the last discrete point. Considering that there is no other discrete point behind the last discrete point, the differential value of at least one virtual discrete point is generated for the last discrete point by means of interpolation or linear fitting, so as to ensure that the signal statistical characteristic value of the last discrete point can be obtained.

In some embodiments, determining whether the respective discrete point is subjected to interference based on the detection threshold, includes: traversing discrete points and determining whether the signal statistical characteristic value of the current discrete point is greater than the detection threshold; determining that the current discrete point is subjected to interference in response to the signal statistical characteristic value of the current discrete point being greater than the detection threshold; and determining that the current discrete point is not subjected to interference in response to the signal statistical characteristic value of the current discrete point being less than or equal to the detection threshold.

In some embodiments, determining the detection threshold of the signal unit based on the signal statistical characteristic value of the respective discrete point, includes: obtaining an average value or a median of signal statistical characteristic values of discrete points; and taking the average value or the median as the detection threshold of the signal unit. The average value is a mean value of a set of data, and it is convenient to use the average value as the detection threshold of the signal unit. The median is a relatively "moderate" value in a set of data, and the effect of very large and very small values of data on the median is very small, so the use of the median of the statistical characteristic value in the statistical characteristic sequence as the detection threshold is completely independent of the impact of local signal amplitude anomalies (too large or too small), further improving the accuracy of signal interference detection and reducing false alarm rate.

In some embodiments, the median is obtained based on histogram statistics. The use of the histogram allows the median of a statistical characteristic sequence to be quickly determined, which also allows a detection threshold for signal interference detection to be quickly determined, thereby further improving the speed and efficiency of signal interference detection.

In some embodiments, obtaining the median based on histogram statistics, includes: performing sorting on the signal statistical characteristic values of the discrete points in a descending order sorting or an ascending order; dividing the signal statistical characteristic value of the respective discrete point after sorting into a respective interval according to a predetermined interval division criteria and a predetermined number of intervals, and separately counting a number of signal statistical characteristic values divided into the respective interval; generating a frequency distribution histogram according to the number of the signal statistical characteristic values divided into the respective interval and the number of the intervals; and obtaining the median of the signal statistical characteristic values of the discrete points by performing calculation based on the frequency distribution histogram.

In some embodiments, the method further includes: after determining whether the respective discrete point is subjected to interference, determining whether a number of discrete points subjected to interference is greater than a predetermined threshold; and determining that the signal unit is subjected to interference in response to the number of discrete points subjected to interference being greater than the predetermined threshold. Considering that if only a few discrete points are determined to be subjected to interference, it may be caused by an error in statistics or an error in determination, the entire signal unit is determined to be subjected to interference only when a certain number of discrete points are determined to be subjected to interference, so as to better enhance the accuracy of the signal interference detection and reduce the false alarm rate in the detection of the signal interference detection.

In some embodiments, the method further includes: after determining whether the respective discrete point is subjected to interference, obtaining position information of a discrete point subjected to interference in the signal unit; and determining whether the signal unit is subjected to interference based on the position information. Considering that discrete points at certain positions in the signal unit are very important, and if these discrete points are subjected to interference, the information carried by the entire signal unit may be unusable, whether the entire signal unit is subjected to interference is determined based on the position information of the discrete points subjected to interference in the signal unit, so as to better improve the accuracy of signal interference detection.

In some embodiments, the method further includes: after obtaining the position information of the discrete point subjected to interference in the signal unit, obtaining information of interference source based on the position information.

In some embodiments, the signal unit is a signal frame or a chirp signal.

In some embodiments, a waveform of the signal unit is a continuous wave with a frequency varying linearly along time.

In some embodiments, the continuous wave includes at least one of frequency modulated continuous wave (FMCW), stepped-frequency continuous wave (SFCW) and multi-Band chirp (MBC).

In some embodiments, the method further includes: prior to obtaining the signal statistical characteristic value of the respective discrete point in the signal unit: acquiring an echo signal; performing frequency mixing on the echo signal to obtain an intermediate frequency signal; performing analog-to-digital conversion on the intermediate frequency signal to obtain a first discrete signal; and taking the first discrete signal as the signal to be detected.

In some embodiments, taking the first discrete signal as the signal to be detected, includes: performing digital signal processing on the first discrete signal at least once to obtain a second discrete signal; and taking the second discrete signal as the signal to be detected.

BRIEF DESCRIPTION OF THE DRAWINGS

One or more embodiments are illustrated exemplarily by means of figures in the accompanying drawings corresponding thereto, and these exemplary illustrations do not constitute a limitation to the embodiments.

DETAILED DESCRIPTION OF THE EMBODIMENTS

Figure 1:
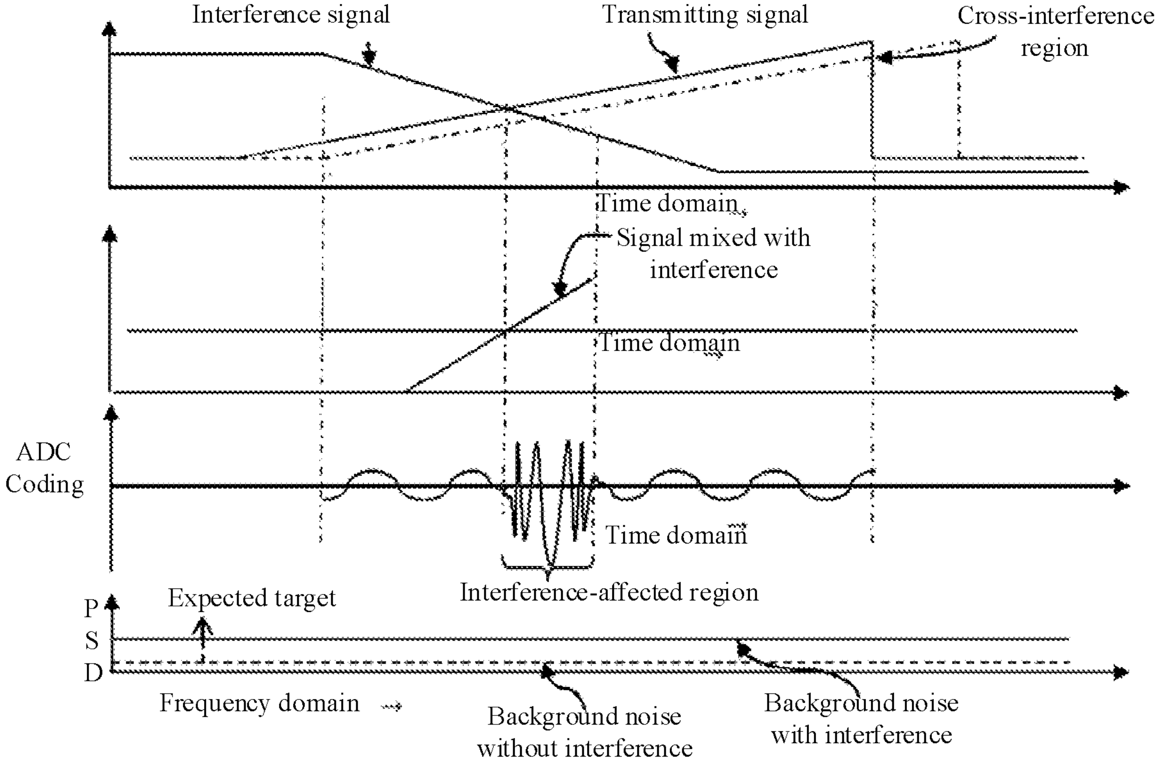
FIG. 1 is a schematic diagram illustrating effects caused by cross-interference on a target signal in the time domain and the frequency domain.

In order to make the purposes, technical solutions and advantages of the embodiments of the present disclosure clearer, the various embodiments of the present disclosure will be described in detail below in connection with the accompanying drawings. However, a person of ordinary skill in the art should understand that, in various embodiments of the present application, a number of technical details have been proposed for the purpose of enabling the reader to better understand the present disclosure. However, even without these technical details and various variations and modifications based on the following embodiments, the technical solution claimed to be protected by the present disclosure can be realized. The following embodiments are divided for the convenience of description, and shall not constitute any limitation on the specific realization of the present disclosure, and various embodiments can be combined with each other and refer to each other under the premise of not contradicting each other.

The following is a detailed description of the signal processing method in the embodiments of the present disclosure, using interference detection as an example, but a person of ordinary skill in the art should understand that, the relevant technical contents documented in the present embodiments may be equally applicable to constant false alarm detection and other processing for discrete signals after spectrum analysis and processing, under the premise of not generating a conflict, specifically:

An embodiment of the present disclosure provides a signal processing method applicable to various radar sensor scenarios using frequency modulated continuous wave (FMCW), stepped-frequency continuous wave (SFCW), or multi-band chirp (MBC), such as in-vehicle radar. In order to facilitate the understanding of the embodiments of the present disclosure, the relevant contents of the signal interference are first introduced herein.

In-vehicle radar usually uses FMCW signals. Using FMCW signals as an example, in-vehicle radar transmits signals, which are reflected by a target and enter into a receiver, after mixing and sampling to form echo signals. The transmitting signals and the echo signals are mixed to obtain mixed signals, on which discrete sampling is performed to obtain signals, of which the time-domain expression is expressed by the following formula:

$$x(q, l) = \cos\left[2\pi \cdot \left(f_B \cdot T_s \cdot q + f_{rd} \cdot T_D \cdot l + \frac{2 \cdot f_c \cdot R}{c}\right)\right]$$

where q is the number of sampling points of a chirp signal, l is a serial number of the chirp signal, R is a normal distance of the target, $f_B$ is a distance frequency of the target, $T_s$ is a sampling time, $f_{rd}$ is a Doppler frequency of the target, $T_D$ is duration of the chirp signal, and $f_c$ is a center frequency of the transmitting signal.

If there are other radars in the current environment, the transmitting signals of other radars may also enter the receiver to form interference signals, which may be categorized as cross-interference and parallel interference.

When the slope of the interference signal is not equal to that of the transmitting signal of the in-vehicle radar, cross-interference occurs. FIG. 1 shows the impact of cross-interference on the target signal in the time domain and the frequency domain. Since the slope of the interference signal is not equal to that of the transmitting signal, at a certain moment, the interference signal and the transmitting signal may inevitably cross and collide, to form a fast-changing signal, which may elevate the background noise, resulting in that the weaker target signals cannot be detected.

Figure 2:
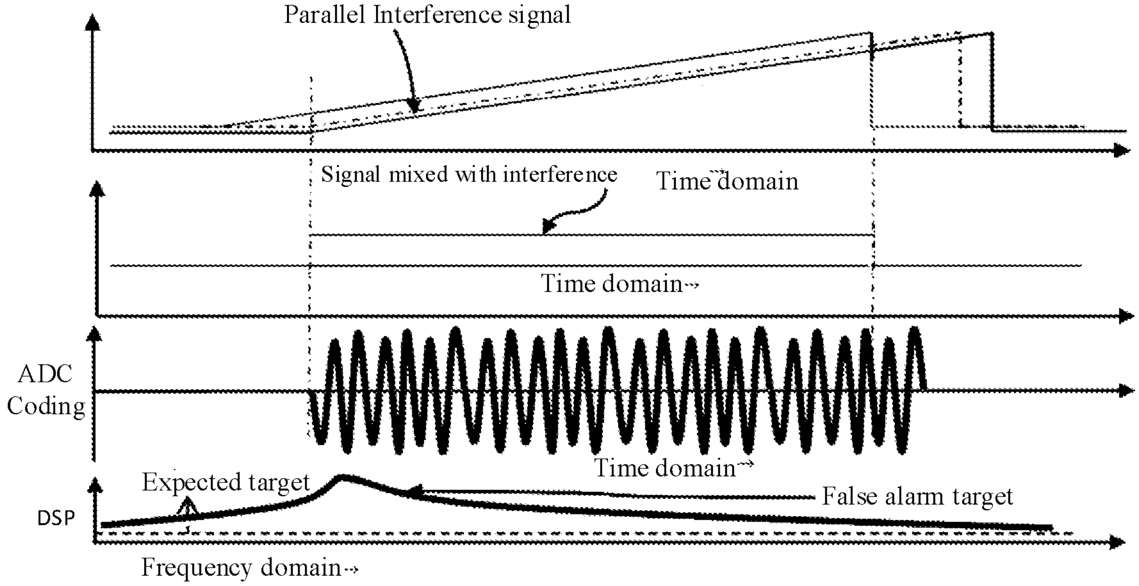
FIG. 2 a schematic diagram illustrating effects caused by parallel interference on a target signal in the time domain and the frequency domain.
Figure 3:
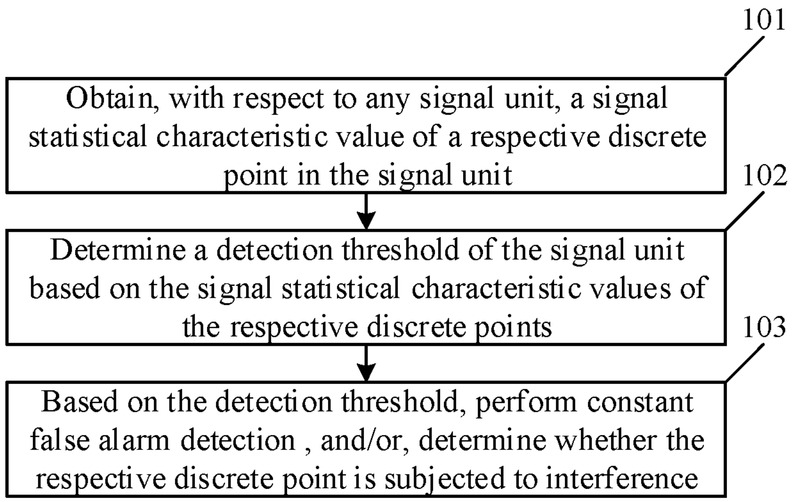
FIG. 3 is a flowchart of a signal processing method in accordance with an embodiment of the present disclosure.
Figure 4:
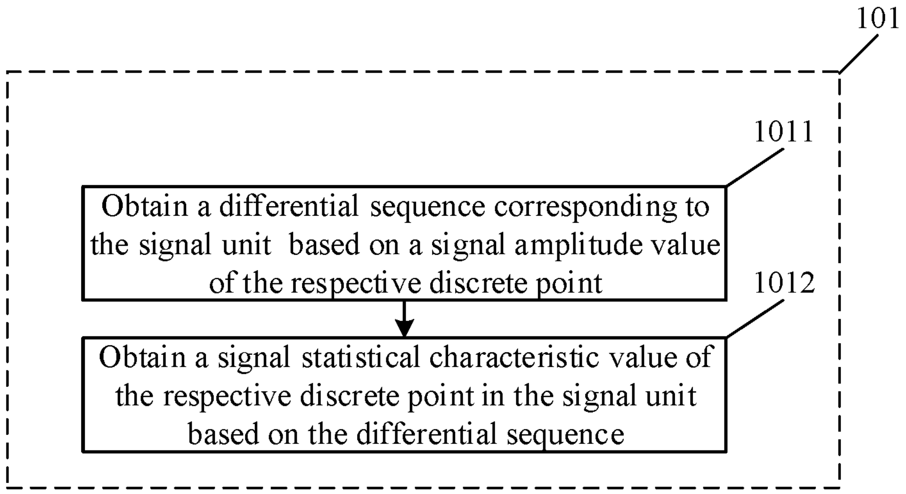
FIG. 4 is a flowchart of obtaining, with respect to any signal unit, a statistical characteristic value of signal at a respective discrete point in the signal unit in accordance with an embodiment of the present disclosure.

When the slope of the interference signal is equal to that of the transmitting signal of the in-vehicle radar, parallel interference occurs. FIG. 2 shows the impact of parallel interference on the target signal in the time domain and the frequency domain. The interference signal is close or similar to the transmitting signal, a parallel collision occurs within a certain period of time, and after the collision, a signal similar to the real target signal is formed, which generates the phenomenon of false alarm, seriously affecting the subsequent signal processing.

Therefore, the treatment of signal interference phenomena is very important for subsequent applications. At present, a variety of ideas have been put forward to solve the problem of signal interference. One is randomization of waveform of the transmitting signal, which is intended to actively avoid being interfered with other radar signals by randomly change the waveform of the transmitting signal in phase, frequency sweep duration, scanned frequency, but in practice, the effect of this processing strategy is limited. Another is to detect where signal interference occurs first, and then cooperate with the strategy of changing the waveform of the transmitting signal and recovering the interference signal to eliminate the interference. The other is to detect where signal interference occurs first, and then avoid the interference by means of frequency modulation and so on.

It can be seen that the core of solving the problem of signal interference is to effectively and stably detect and identify the interference, the relatively mature signal processing methods in the art include: signal interference detection based on signal amplitude, signal interference detection based on a differential sequence of signal amplitude, signal interference detection based on periodicity of change in signal amplitude, signal interference detection based on energy of signal after passing through a high-pass filter, and so on.

However, the above signal processing methods have certain problems. For example, the signal interference detection based on the signal amplitude is only effective for particularly strong interference signals, and if the interference signal is relatively weak, the detection effect may be very poor. The signal interference detection based on the differential sequence of the signal amplitude is very susceptible to the influence of noise perturbation, the detection process is not continuous, and the detection effect is unstable. The signal interference detection based on the periodicity of the change in the signal amplitude is also susceptible to the influence of noise perturbation. The signal interference detection based on the energy of the signal after passing through the high-pass filter can only detect the existence of signal interference in the current chirp signal, and cannot accurately position which of signal segments or which of sampling points is subjected to interference.

In order to solve the above problems of signal interference detection such as unstable process, susceptibility to noise perturbation, and low detection accuracy, an embodiment of the present disclosure provides a signal processing method, configured to perform interference detection on signal units in discrete signals to be detected, may be specifically applied to a terminal or a processor, and this embodiment and the following embodiments are illustrated using a processor as an example. The following is a specific description of the realization details of the signal processing method of this embodiment, and the following contents are only the realization details provided for convenience of understanding, and are not necessary for the implementation of this embodiment.

A specific flow of the signal processing method of this embodiment may be shown in FIG. 1, including:

In 101, with respect to any signal unit, a signal statistical characteristic value of a respective discrete point in the signal unit is obtained.

In a specific implementation, after the processor acquires the discrete signals to be detected, a signal unit may be selected in the discrete signals to be detected for interference detection. Usually, the signals to be detected include multiple signal units, and the processor may perform interference detection on the multiple signal units included in the signals to be detected in a sequential order.

In some examples, the signal unit selected by the processor from the signals to be detected may be a signal frame or a chirp signal, or the processor may select a plurality of consecutive chirp signals as a single signal unit.

In some examples, the waveform of the signal unit selected by the processor from the signals to be detected is a continuous wave with a frequency varying linearly along time, and the continuous wave includes at least one of FMCW, SFCW and MBC.

In some examples, the processor, before performing signal interference detection, may acquire the signals to be detected by the following operations: acquiring an echo signal; performing frequency mixing on the acquired echo signal to obtain an intermediate frequency signal; performing analog-to-digital conversion, sampling, and other processing on the intermediate frequency signal obtained after frequency mixing to obtain a first discrete signal, and taking the first discrete signal as the signal to be detected. That is, in this embodiment, the first discrete signal obtained after the digital-to-digital conversion may be directly used as a signal to be detected. In this way, the signal interference detection is performed after the digital-to-digital conversion (ADC), the earlier the signal interference is detected, the earlier the interference is processed, thus the less the interference affects the subsequent application of the radar.

In other examples, the processor, before performing the signal interference detection, may acquire the signals to be detected by the following operations: acquiring an echo signal; performing frequency mixing on the acquired echo signal to obtain an intermediate frequency signal; performing analog-to-digital conversion on the intermediate frequency signal obtained after frequency mixing to obtain a first discrete signal, performing digital signal processing on the first discrete signal at least once to obtain a second discrete signal; and taking the second discrete signal as the signal to be detected. In this embodiment, the second discrete signal obtained after digital signal processing is used as the signal to be detected, that is, the signal interference detection is performed at the DSP threshold.

In some examples, the processor obtains, with respect to any signal unit, a signal statistical characteristic value of a respective discrete point in the signal unit, which may be realized by various sub-operations as shown in FIG. 2, including:

In 1011, a differential sequence corresponding to the signal unit is obtained based on a signal amplitude value of the respective discrete point.

In a specific implementation, the processor, after determining the signal unit, may further determine the respective discrete point in the signal unit, obtain the signal amplitude of the respective discrete point, and obtain the differential sequence corresponding to the signal unit by performing calculation based on the signal amplitude of the respective discrete point in the signal unit. Here, the differential sequence corresponding to the signal unit obtained by performing calculation may be a pre-differential sequence or a post-differential sequence. The differential sequence may well reflect the changes between the signal amplitudes of the discrete points, has a strong anti-interference capability, facilitates more accurate determination of the statistical characteristics of the discrete points in the signal unit, and thus more accurately determines which of the discrete points have been subjected to interference.

In some examples, the processor, after obtaining the signal amplitude of the respective discrete point, may traverse the discrete points in the signal unit, obtain the difference in signal amplitude between a current discrete point and a discrete point adjacent to the current discrete point (for example, a previous discrete point adjacent to the current discrete point or a next discrete point adjacent to the current discrete point) as the differential value of the current discrete point, and obtain the differential sequence of the signal unit based on the differential values of the discrete points in the signal unit.

In some examples, the signal amplitude sequence of discrete points in a certain signal unit is: $\{x_q\}$ (q=1, . . . , Q), and the corresponding differential sequence for the signal unit is obtained by performing calculation as: $\{Z_q=x_q-x_{q-1}\}$ (q=1, . . . , Q), where Q is the total number of discrete points in the signal unit.

In some examples, it is considered that the differential value corresponding to the discrete point at the end of the signal unit cannot be obtained by performing calculation because there is no adjacent discrete point in front of or behind it. For example, when the differential value is obtained by the front difference calculation method, there is no other discrete point in front of the first discrete point in the signal unit, and the differential value cannot be obtained. When the differential value is obtained by the back difference calculation method, there is no other discrete point behind the last discrete point in the signal unit, and the differential value cannot be obtained. Therefore, in this embodiment, a value is interpolated at outside of the end of a sequence of discrete points to increase a virtual discrete point, and the differential value of the end discrete point is obtained by using the signal amplitude of the virtual discrete point, thereby ensuring that the differential value can be obtained for each of the discrete points.

In some examples, if the signal amplitude of the current discrete point minus the signal amplitude of the next discrete point adjacent to the current discrete point obtains the differential value of the current discrete point (i.e., the post-difference method), for the last discrete point, the processor may obtain the signal amplitude of a first virtual discrete point by post-interpolating or linear fitting, and subtract the signal amplitude of that first virtual discrete point from the signal amplitude of the last discrete point to obtain the differential value of the last discrete point by. If the signal amplitude of the previous discrete point adjacent to the current discrete point is subtracted from the signal amplitude of the current discrete point to obtain the differential value of the current discrete point, for the first discrete point, the processor may obtain the signal amplitude of a second virtual discrete point by pre-interpolating or linear fitting, and subtract the signal amplitude of the second virtual discrete point from the signal amplitude of the first discrete point, to obtain the differential value of the first discrete point.

In 1012, a signal statistical characteristic value of the respective discrete point in the signal unit is obtained based on the differential sequence.

Specifically, the processor, after obtaining a corresponding differential sequence of the signal unit based on the signal amplitude of the respective discrete point, may obtain the signal statistical characteristic value of the respective discrete point in the signal unit based on the differential sequence.

In the specific implementation, the processor, after obtaining the differential sequence corresponding to the signal unit based on the signal amplitude of the respective discrete point, takes an order moment as a statistical variable, and obtains the signal statistical characteristic value of the respective discrete point in the signal unit based on the signal statistical characteristic presented by the differential values of at least some of the discrete points in the differential sequence corresponding to the signal unit, i.e., taking the interference as a kind of abnormal event in the normal signal, and transforming the idea of signal interference detection into the idea of abnormal event detection, thereby utilizing the signal statistical characteristic for the interference detection. Here, the order moment is an N-order moment, and N is an integer greater than 0. When N is 1, the statistical variable is a first-order moment, which is also referred to as expectation. When N is 2, the statistical variable is a second-order moment, which is also referred to as variance. The order moments can well reflect the global property of a set of data, and the order moment is used as a tool to count the signal statistical characteristics presented by the differential values of some discrete points, so that the signal statistical characteristic values of the respective discrete point can be obtained more accurately.

Figure 5:
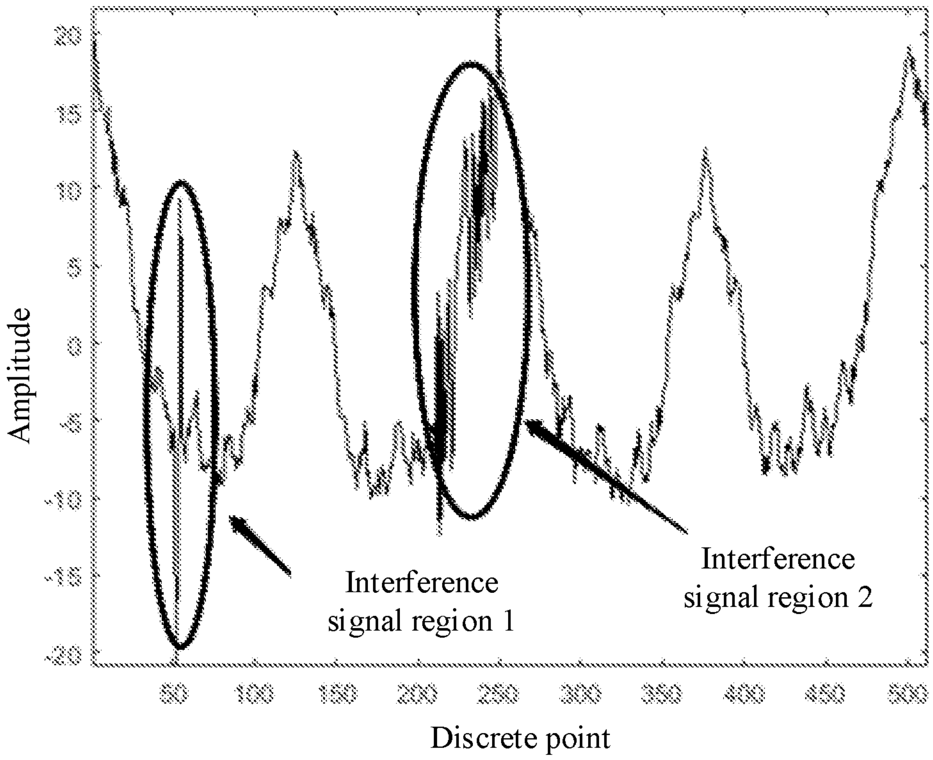
FIG. 5 is a schematic diagram illustrating a waveform of a chirp signal in accordance with an embodiment of the present disclosure.
Figure 6:
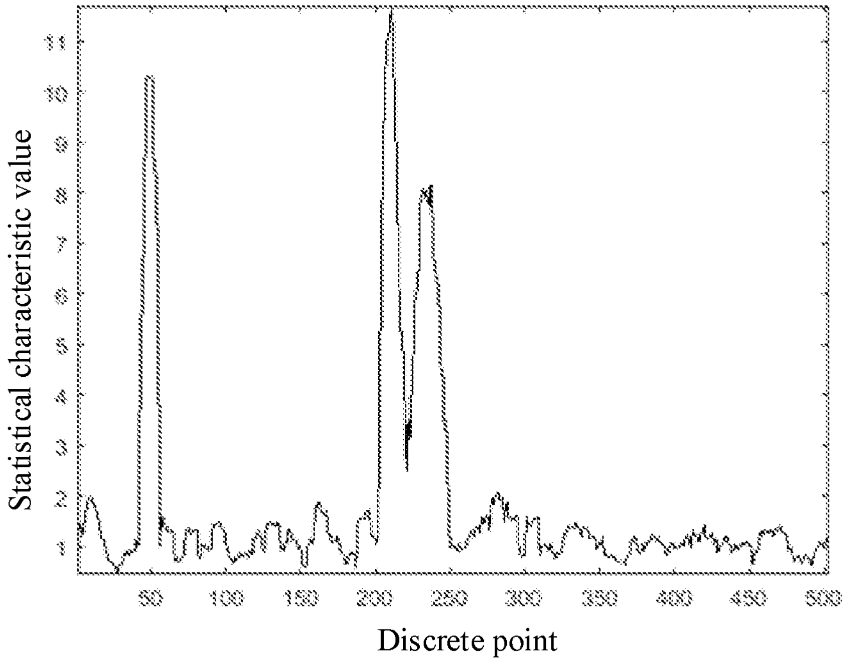
FIG. 6 is a schematic diagram illustrating a signal statistical characteristics sequence corresponding to a chirp signal in accordance with an embodiment of the present disclosure.

In some examples, the signal unit is a chirp signal, which may be shown in FIG. 5. From the waveform of the chirp signal in FIG. 5, in fact, it can be seen that there is interference presented in the chirp signal, but determining the presence of interference in the chirp signal is not the ultimate purpose of signal interference detection, the ultimate purpose of signal interference detection is to accurately determine which of segments of the signal unit, or which of discrete points is subjected to the interference, and thus through the technical means to eliminate the effect of the signal interference. The processor carries out the corresponding difference calculation on the chirp signal to obtain the differential sequence corresponding to the chirp signal, and then further carries out the statistical characteristic calculation on the differential sequence corresponding to the chirp signal to obtain the signal statistical characteristic value of the respective discrete point in the chirp signal, i.e., the signal statistical characteristic sequence corresponding to the chirp signal, which may be shown in FIG. 6.

In some examples, the processor, in using the order moments as the statistical variable and obtaining the signal statistical characteristic value of the respective discrete point based on the signal statistical characteristic presented by the differential value of at least some of the discrete points in the differential sequence, may traverse the discrete points and obtain the signal statistical characteristic value of the current discrete point based on the differential value of the at least one discrete point prior to the current discrete point, using the order moment as the statistical variable. In particular, if the current discrete point is the first discrete point in the signal unit, the processor may obtain the differential value of at least one third virtual discrete point (dummy) by means of pre-interpolating or linear fitting, and obtain the signal statistical characteristic value of the first discrete point based on the differential value of the at least one third virtual discrete point, using the order moment as the statistical variable. Considering that there is no other discrete point in front of the first discrete point, in the present disclosure, the differential value of the at least one virtual discrete point is generated for the first discrete point by means of pre-interpolating or linear fitting, so as to ensure that the signal statistical characteristic value of the first discrete point can be obtained.

In some examples, the processor may obtain the signal statistical characteristic value of the respective discrete point based on a sliding window. The length of the sliding window is set to L, and L is an integer greater than 1. The processor may traverse the discrete points and obtain the signal statistical characteristic value of the current discrete point based on the differential values of the L discrete points prior to the current discrete point, or based on the differential value of the L discrete points selected with the current discrete point as the center. Considering that the presence of noise is unavoidable, in order to improve the accuracy of the determined statistical characteristics, in this embodiment, the sliding window statistics is adopted to obtain the signal statistical characteristic value of the respective discrete point, which can weaken the noise as much as possible, and thus avoid the signal interference detection process from being affected by the noise.

In a specific implementation, the discrete points correspond to different sliding windows in position, but the sliding windows are the same in length, so as to improve the standardization and normalization of the process of calculating statistical properties.

In some examples, the processor obtains the signal statistical characteristic values of the respective discrete point based on the sliding window by the following formula:

$$\delta_q = \frac{1}{L}\sum_{i=1}^{L} |Z_i|^N,$$

where L is the length of the sliding window, $Z_i$ is the differential value of the $i^{th}$ discrete point within the sliding window, N is used to represent the N-order moment, and $\delta_q$ is the signal statistical characteristic value of the $q^{th}$ discrete point.

It should be noted that, when the processor obtains the signal statistical characteristic value of the current discrete point based on the differential values of the L discrete points selected with the current discrete point as the center, if the current discrete point is the last discrete point in the signal unit, the processor may obtain the differential values of at least one fourth virtual discrete point by means of post-interpolating or linear fitting to obtain the signal statistical characteristic value of the last discrete point. Considering that there is no other discrete point behind the last discrete point, in this embodiment, the differential value of the at least one virtual discrete point is generated for the last discrete point by means of interpolating or linear fitting, so as to ensure that the signal statistical characteristic value of the last discrete point can be obtained.

In 102, a detection threshold of the signal unit is determined based on the signal statistical characteristic values of the respective discrete points.

In a specific implementation, the processor may obtain an average value of the signal statistical characteristic values of the discrete points, and take the average value as the detection threshold of the signal unit.

In some examples, the processor may obtain the average value of the signal statistical characteristic values of the discrete points by using the following formula:

$$Thres = \frac{1}{Q}\sum_{q=1}^{Q} \delta_q,$$

where Q is the total number of discrete points in the signal unit, $\delta_q$ is the signal statistical characteristic value corresponding to the $q^{th}$ discrete point, and Thres is the determined detection threshold. The process of calculating the average value is simple, convenient, and fast, and the use of the average value of the signal statistical characteristic values of the discrete points as the detection threshold can further improve the speed and efficiency of the signal interference detection.

In 103, based on the detection threshold, constant false alarm detection is performed, and/or, whether the respective discrete point is subjected to interference is determined.

Figure 7:
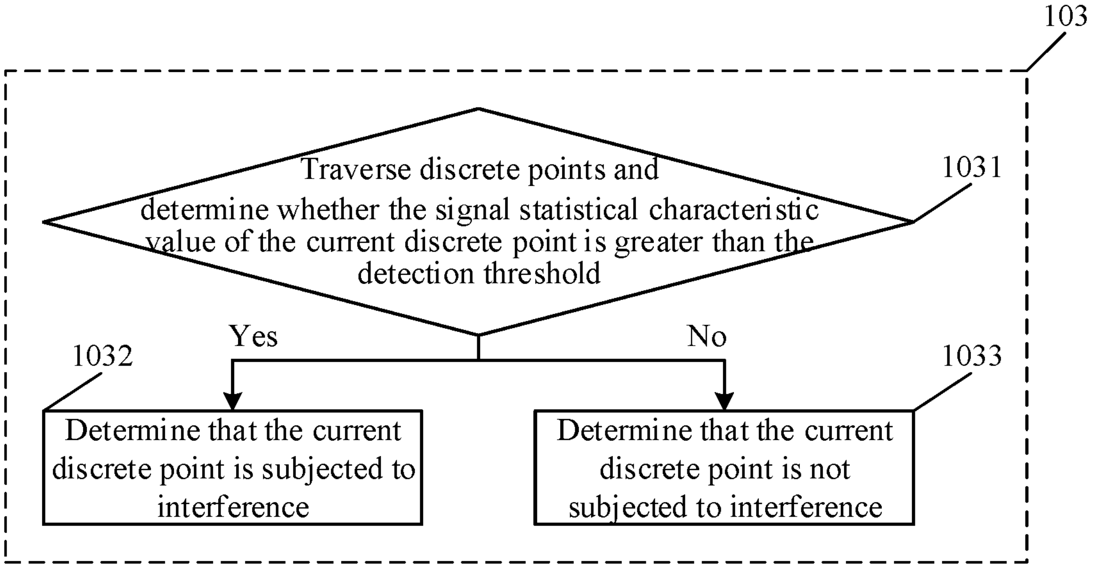
FIG. 7 is a flowchart of determining, based on a detection threshold, whether a respective discrete point is subject to interference in accordance with an embodiment of the present disclosure.

In a specific implementation, the processor may determine, based on the detection threshold, whether the respective discrete point is subjected to interference, in accordance with sub-steps as shown in FIG. 7, specifically including:

In 1031, the discrete points are subjected to traversal and whether the signal statistical characteristic value of the current discrete point is greater than the detection threshold is determined. If so, operation 1032 is performed; otherwise, operation 1033 is performed.

In 1032, it is determined that the current discrete point is subjected to interference.

In 1033, it is determined that the current discrete point is not subjected to interference.

In a specific implementation, after the processor determines the detection threshold of the signal unit, whether the signal statistical characteristic value of the respective discrete point is less than the detection threshold is determined in sequence, and a discrete point of which a corresponding signal statistical characteristic value is less than or equal to the detection threshold is not subjected to interference, while a discrete point of which a corresponding statistical characteristic value is greater than the detection threshold is subjected to interference, and the processor may output a serial number of the discrete point which is subjected to interference as a target for subsequent elimination of the signal interference.

In this embodiment, the signal statistical characteristic value of the respective discrete point in the signal unit is first obtained, then the detection threshold of the signal unit is determined based on the signal statistical characteristic value of the respective discrete point, and finally, based on the detection threshold, whether the respective discrete point is subjected to interference is determined, or constant false alarm rate (CFAR) detection is performed. Considering that signal interference detection based on factors such as changes in signal amplitude, periodicity of signal amplitude changes, etc., is easily affected by noise and the accuracy of interference detection is low, whereas in the embodiments of the present disclosure, interference detection or constant false alarm detection is performed on signal units in discrete signals to be detected, i.e., signal interference detection is carried out at the ADC threshold or the DSP threshold, so as to identify or dealing with the interference occurred as early as possible, to reduce the impact on subsequent applications. By obtaining the statistical characteristics of the signal unit, from the signal unit as a whole, a scientific, reasonable, targeted detection threshold is determined, such signal interference detection process is less affected by the signal local mutation and noise, effectively improving the efficiency and accuracy of signal interference detection, and reducing the false alarm rate of signal interference detection. At the same time, for a discrete signal that is determined to be not subjected to interference by the interference detection, or for a discrete signal that is determined to be subjected to interference by the interference detection and is subjected to interference elimination processing, or for a discrete signal that is obtained by performing discrete spectrum analysis processing, such as any one or any combination of a distance-dimensional FFT, a velocity-dimensional FFT and an angle-dimensional FFT, directly on a discrete signal that is not subjected to the interference detection, on the basis of the same ideas, that is, the false alarm detection threshold of the respective signal unit is determined based on the signal statistical characteristic value, and constant false alarm detection can be performed based on the false alarm detection threshold for accurate target detection.

It should be noted that, when the signal processing method in the embodiments of the present disclosure is used to perform interference detection on the signal unit in the discrete signal to be detected, the discrete signal to be detected may be a signal at an ADC threshold, at a DSP threshold or the like, whereas when the signal processing method in the embodiments of the present disclosure is used to perform constant false alarm detection on the signal unit in the discrete signal to be detected, the discrete signal to be detected may be a discrete signal that is obtained by processing of discrete spectrum analysis such as a range-dimensional FFT and/or a velocity-dimensional FFT and/or an angle-dimensional FFT, and the like.

In an embodiment, the processor may obtain a median of the signal statistical characteristic values of the discrete points, and take the median as a detection threshold for the signal unit. The median is a relatively “moderate” value in a set of data, and the effect of very large and very small values of data on the median is very small, so the use of the median of the statistical characteristic values in the statistical characteristic sequence as the detection threshold is completely independent of the impact of local signal amplitude anomalies (too large or too small), further improving the accuracy of signal interference detection and reducing the false alarm rate.

In some examples, the processor may obtain the median based on histogram statistics. The use of the histogram allows for a quick determination of the median of a statistical characteristic sequence, and also allows for a quick determination of a detection threshold for signal interference detection, thereby further improving the speed and efficiency of signal interference detection.

Figure 8:
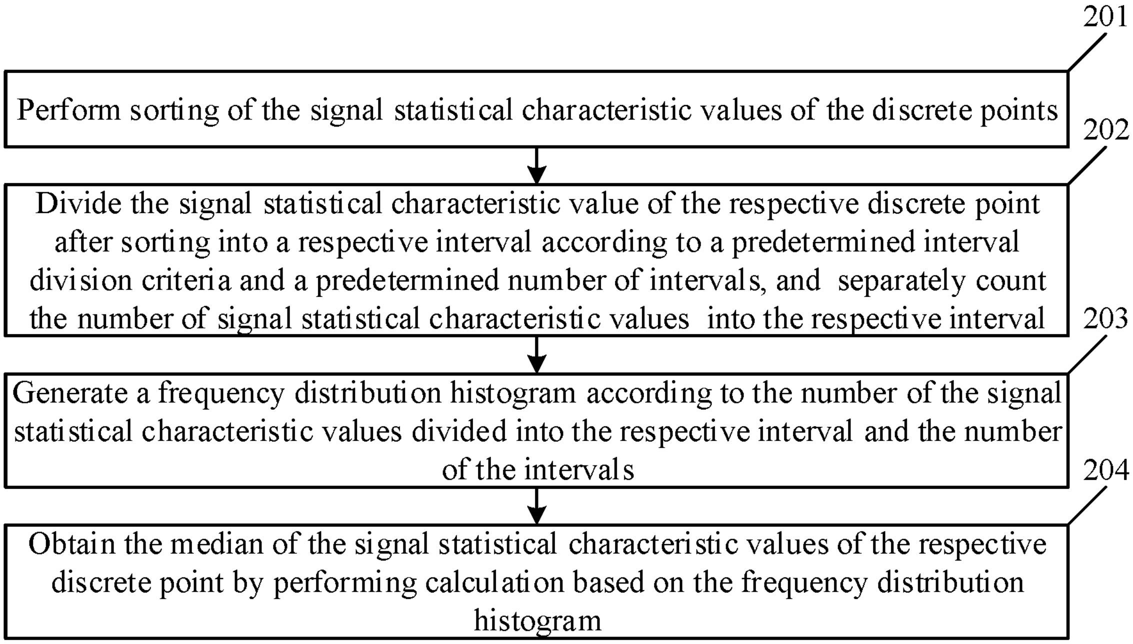
FIG. 8 is a flowchart of obtaining a median of signal statistical characteristics values of a respective discrete point based on histogram statistics in accordance with an embodiment of the present disclosure.

In some examples, the processor obtains the median of the signal statistical characteristic values of the respective discrete point based on histogram statistics by various operations as shown in FIG. 8, including:

In 201, sorting of the signal statistical characteristic values of the discrete points is performed.

Specifically, the processor, after determining the signal statistical characteristic value of the respective discrete point in the signal unit, may perform sorting of the signal statistical characteristic values of the discrete points. The sorting of the signal statistical characteristic values of the discrete points may be performed by the processor in a descending order sorting or an ascending order.

In 202, according to a predetermined interval division criteria and a predetermined number of intervals, the signal statistical characteristic value of the respective discrete point after sorting is divided into a respective interval, and the number of signal statistical characteristic values divided into the respective interval is counted separately.

In 203, a frequency distribution histogram is generated according to the number of the signal statistical characteristic values divided into the respective interval and the number of the intervals.

In a specific implementation, a histogram is used to determine the median of the signal statistical characteristic values of the respective discrete point. First of all, the histogram corresponding to the signal unit is generated, and the processor, according to the predetermined interval division criteria and the predetermined number of intervals, divides the signal statistical characteristic value of the respective discrete point after sorting into the respective interval, and counts the number of the signal statistical characteristic values divided into the respective interval, and then generates the frequency distribution histogram of the signal statistical characteristic values based on the number of the signal statistical characteristic values (that is, the frequency corresponding to the respective interval) divided into the respective interval and the number of the intervals.

Figure 9:
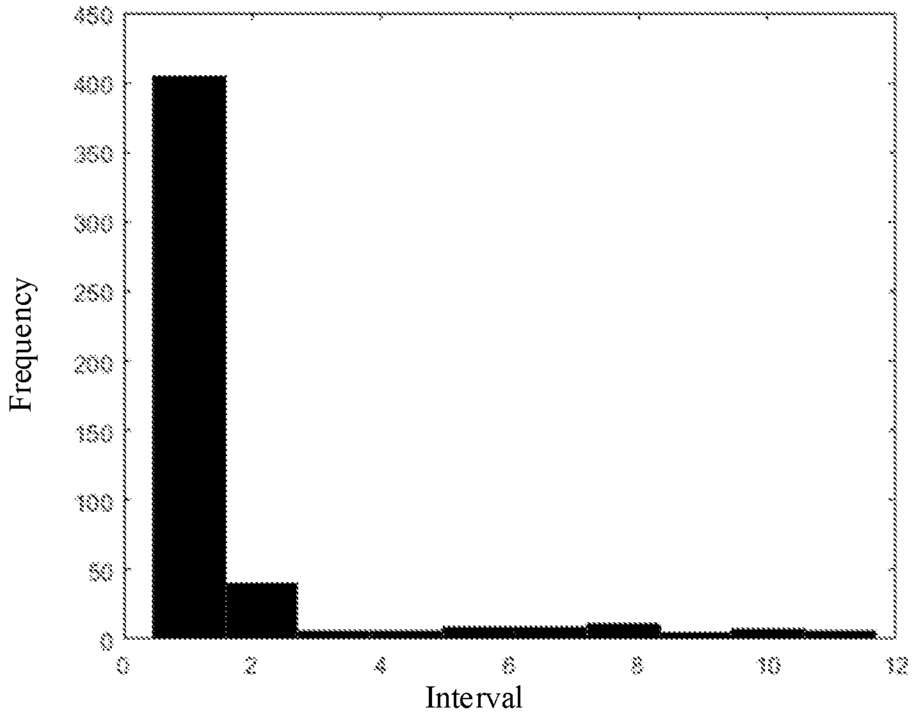
FIG. 9 is a schematic diagram illustrating a histogram of a frequency distribution in accordance with an embodiment of the present disclosure.

In some examples, the frequency distribution histogram generated by the processor may be shown in FIG. 9.

In 204, the median of the signal statistical characteristic values of the respective discrete point is obtained by performing calculation based on the frequency distribution histogram.

Figure 10:
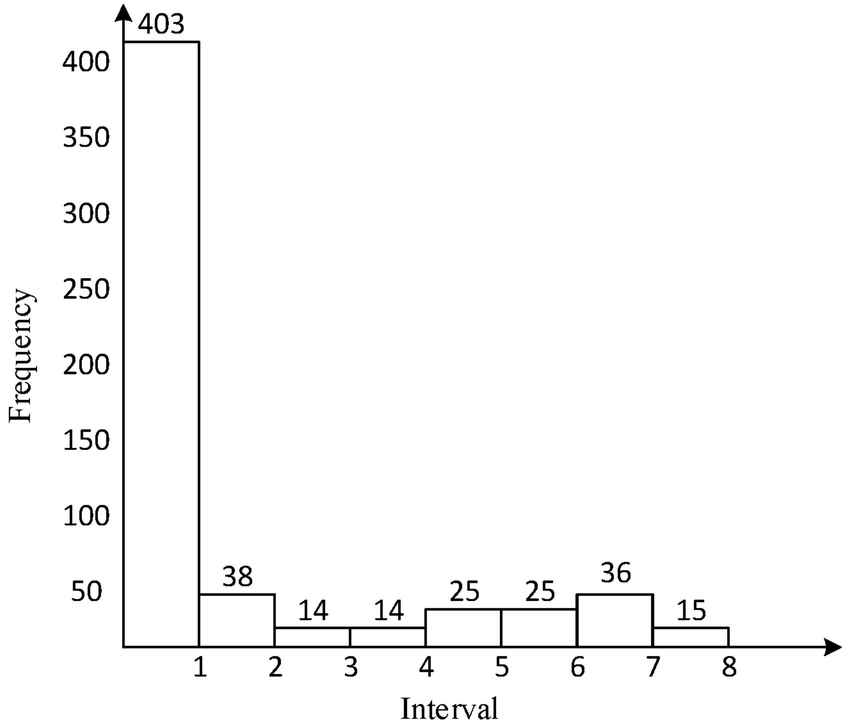
FIG. 10 is a schematic diagram illustrating another histogram of a frequency distribution in accordance with an embodiment of the present disclosure.

In some examples, the frequency distribution histogram generated by the processor may be shown in FIG. 10, where frequencies of the intervals are (0,1]: 403, (1,2]:38, (2,3]: 14, (3,4]: 14, (4,5]: 20, (5,6]: 25, (6,7]: 36, and (7,8]: 15, respectively, and it is clear that the median may fall in the interval of (0,1], the processor may set the median as mid, and solve the formula: 403×(mid-0)=0.5, to get the median mid of 0.00124.

Figure 11:
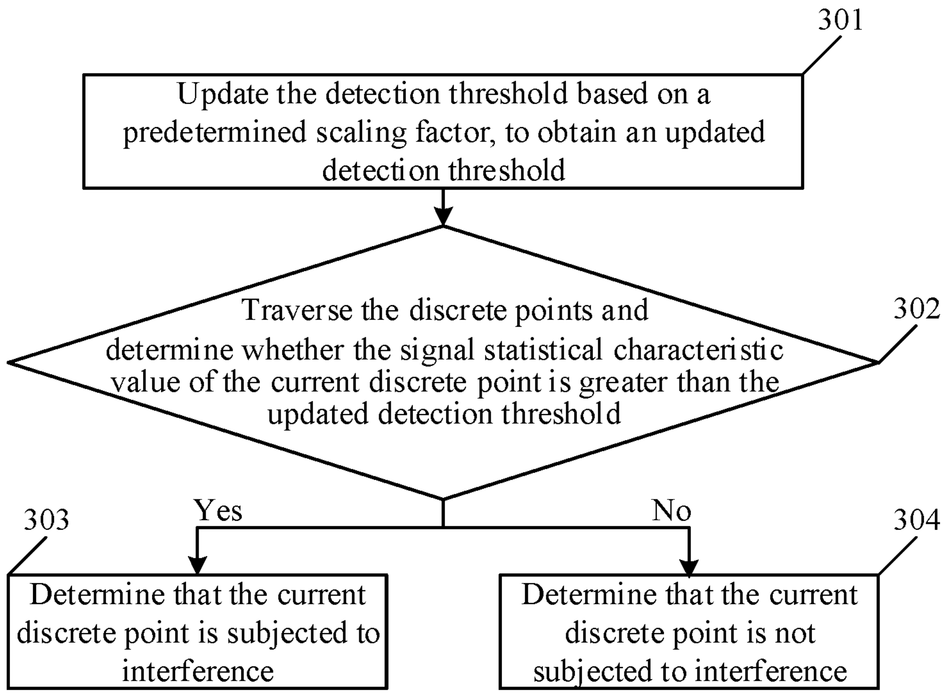
FIG. 11 is a flowchart of determining, based on a detection threshold, whether a respective discrete point is subject to interference in accordance with another embodiment of the present disclosure.

In an embodiment, the processor determines, based on the detection threshold, whether the respective discrete point is subjected to interference, by various operations as shown in FIG. 11, including:

In 301, the detection threshold is updated based on a predetermined scaling factor, to obtain an updated detection threshold.

In a specific implementation, the detection threshold is very important for signal interference detection. If the detection threshold is set too large, although the false alarm rate of the signal interference detection can be reduced, the miss probability may be higher, whereas if the detection threshold is set too small, the miss probability may be lower, but the false alarm rate may be higher. Therefore, in this embodiment, after determining the detection threshold, the detection threshold may be updated according to the predetermined scaling factor to obtain the updated detection threshold, that is, the detection threshold is scaled in accordance with the actual situation, and the use of the updated detection threshold for signal interference detection can make the miss probability and the false alarm rate of the signal interference detection reach an acceptable balance.

In 302, the discrete points are subjected to traversal and whether the signal statistical characteristic value of the current discrete point is greater than the updated detection threshold is determined. if so, operation 303 is performed; otherwise, operation 304 is performed.

In 303, it is determined that the current discrete point is subjected to interference.

In 304, it is determined that the current discrete point is not subjected to interference.

In some examples, the processor may determine whether the signal statistical characteristic value corresponding to the respective discrete point is less than the updated detection threshold by the following formula:

$$F(q) = \begin{cases} 1, & (\delta_q \geq \alpha \cdot Thres) \\ 0, & (\delta_q < \alpha \cdot Thres) \end{cases}$$

where $\delta_q$ is the statistical characteristic value corresponding to the $q^{th}$ discrete point, Thres is the detection threshold, α is the predetermined scaling factor, α·Thres is the updated detection threshold, and F(q)=1 is used to represent that the $q^{th}$ discrete point is subjected to interference, while F(q)=0 is used to represent that the $q^{th}$ discrete point is not subjected to interference.

Figure 12:
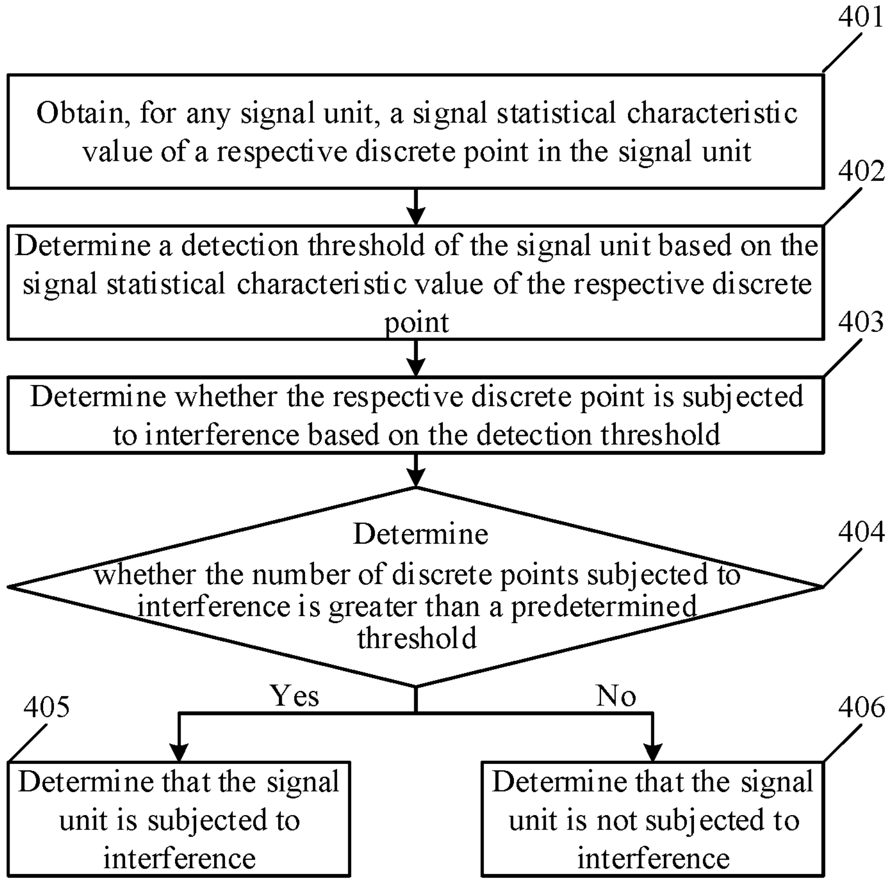
FIG. 12 is a flowchart of a signal processing method in accordance with another embodiment of the present disclosure.

Another embodiment of the present disclosure relates to a signal processing method, the following is a specific description of the implementation details of the signal processing method of this embodiment, the following contents are only for the convenience of understanding the details of the implementation, and are not necessary for the implementation of this embodiment, and a specific flowchart of the signal processing method of this embodiment may be shown in FIG. 12, including:

In 401, for any signal unit, a signal statistical characteristic value of a respective discrete point in the signal unit is obtained.

In 402, a detection threshold of the signal unit is determined based on the signal statistical characteristic value of the respective discrete point.

In 403, whether the respective discrete point is subjected to interference is determined based on the detection threshold.

Among them, operation 401 to operation 403 are substantially the same as operation 101 to operation 103, respectively, and will not go into details herein.

In 404, whether the number of discrete points subjected to interference is greater than a predetermined threshold is determined. If so, operation 405 is performed; otherwise, operation 406 is performed.

In 405, it is determined that the signal unit is subjected to interference.

In 406, it is determined that the signal unit is not subjected to interference.

In a specific implementation, considering that if only a few discrete points are determined to be subjected to interference, it may be caused by an error in statistics or an error in determination, thus it is determined that the entire signal unit is subjected to interference only when a certain number of discrete points are determined to be subjected to interference, so as to better improve the accuracy of the signal interference detection, and reduce the false alarm rate in the signal interference detection.

Figure 13:
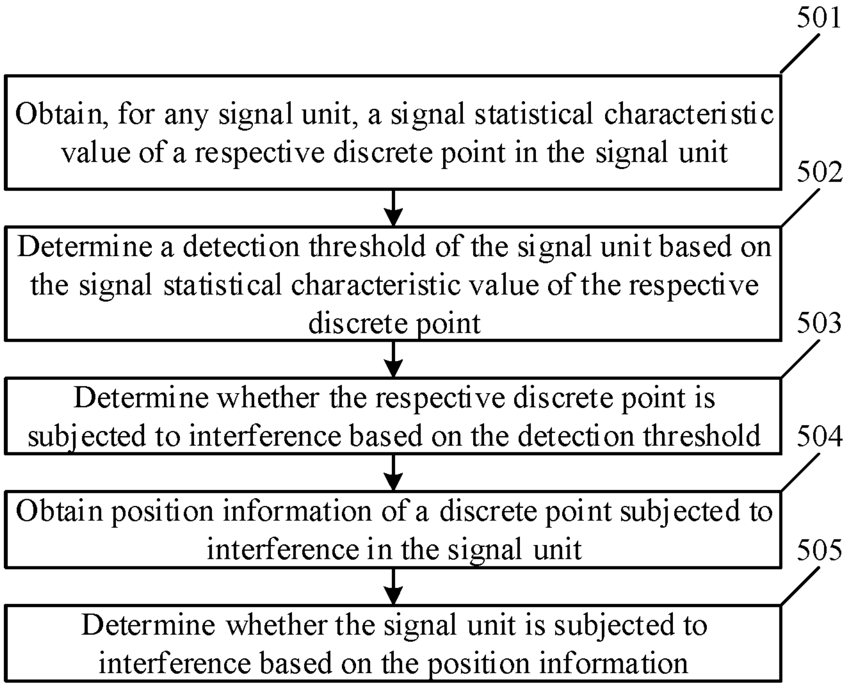
FIG. 13 is a flowchart of a signal processing method in accordance with still another embodiment of the present disclosure.

Another embodiment of the present disclosure relates to a signal processing method, the following is a specific description of the implementation details of the signal processing method of this embodiment, the following contents are only for the convenience of understanding the details of the implementation, and are not necessary for the implementation of this embodiment, and a specific flowchart of the signal processing method of this embodiment may be shown in FIG. 13, including:

In 501, for any signal unit, a signal statistical characteristic value of a respective discrete point in the signal unit is obtained.

In 502, a detection threshold of the signal unit is determined based on the signal statistical characteristic value of the respective discrete point.

In 503, based on the detection threshold, whether the respective discrete point is subjected to interference is determined.

Among them, operation 501 to operation 503 are substantially the same as operation 101 to operation 103, respectively, and will not go into details herein.

In 504, position information of a discrete point subjected to interference in the signal unit is obtained.

In 505, whether the signal unit is subjected to interference is determined based on the position information.

In a specific implementation, considering that discrete points at certain positions in the signal unit are very important, and if these discrete points are subjected to interference, the information carried by the entire signal unit may be unusable, thus whether the entire signal unit is subjected to interference is determined based on the position information of the discrete points subjected to interference in the signal unit, so as to better enhance the accuracy of the signal interference detection.

In some examples, the processor, after obtaining the position information of the discrete point subjected to interference in the signal unit, may also obtain information of interference source based on the position information.

The operation division of the above various methods of, is just to describe clearly. When implementing, some operations may be merged into an operation or an operation may be split and decomposed into multiple operations, as long as the same logical relationship is included, these variants are fallen in the protection scope of the present disclosure. Insignificant modifications are added or the irrelevant design is introduced into the algorithm or the process, but does not change the core design of the algorithm and the process, and are within the protection scope of the present disclosure.

Another embodiment of the present disclosure relates to a computer readable storage medium storing a computer program. The computer program, when executed by a processor, causes the processor to implement the method embodiments as described above.

That is, a person skilled in the art may understand that all or some of the operations in the methods of the above embodiments may be implemented by instructing the relevant hardware through a program, stored in a storage medium. The storage medium includes several instructions to cause a device (which may be a single chip computer, a chip, etc.) or a processor to perform all or some of the operations of the methods (e.g., the interference detection method and/or the constant false alarm detection method, etc.) as described in the various embodiments of the present disclosure. The aforementioned storage medium includes: USB flash drives, removable hard disks, read-only memory (ROM for short), random access memory (RAM for short), magnetic disks, or optical disks, and other media that can store program codes.

Figure 14:
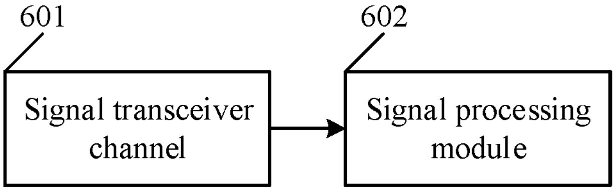
FIG. 14 is a schematic diagram illustrating an integrated circuit in accordance with an embodiment of the present disclosure.

Another embodiment of the present disclosure relates to an integrated circuit, the details of the integrated circuit of this embodiment are illustrated below, and the following is provided only to facilitate an understanding of the details of the implementation, and is not necessary for the implementation of this embodiment. A schematic diagram of the integrated circuit of this embodiment may be shown in FIG. 14, and including:

A signal transceiver channel 601, configured to transmit a radio signal, and to receive an echo signal formed by the radio signal being reflected by a target object.

A signal processing module 602, configured to perform signal processing based on the signal processing method as described above.

In some examples, the signal processing module includes an interference detection module and/or a constant false alarm detection module. The interference detection module is configured to perform signal interference detection based on the signal processing method as described above, and the constant false alarm detection module is configured to perform the constant false alarm detection based on the signal processing method as described above.

It should be noted that, when the interference detection module and the constant false alarm detection module are integrated in an integrated circuit, for an echo signal unit, processing such as interference detection, interference processing (e.g. conventional interference processing performed with respect to detected signal subjected to interference, or zeroing performed with respect to signal subjected to interference and re-generating a corresponding signal by interpolating or fitting performed based on remaining signals not subjected to interference to supplement the zeroed signal), constant false alarm detection, and the like, may be performed in sequence, or may be performed separately, and alternatively the aforementioned interference detection, interference processing, and constant false alarm detection may be carried out with respect to different echo signal units at the same time. At the same time, hardware such as a statistical characteristic value calculation unit and a threshold calculation unit may be partially or completely shared to improve the integration degree, or the hardware structure may be set up separately according to the demand to improve the overall signal processing efficiency.

Figure 15:
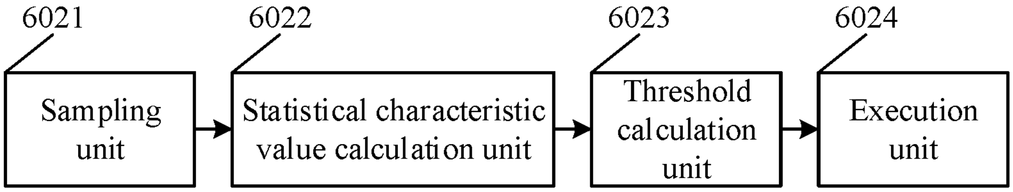
FIG. 15 is a schematic diagram illustrating a signal processing module in accordance with an embodiment of the present disclosure.

In some examples, as shown in FIG. 15, the signal processing module 602 may include:

A sampling unit 6021, configured to perform sampling on the echo signal to obtain a discrete signal to be detected, and to determine a signal unit based on the signal to be detected.

A statistical characteristic value calculation unit 6022, configured to obtain the signal statistical characteristic value of the respective discrete point in the signal unit.

A threshold calculation unit 6023, configured to determine a detection threshold of the signal unit based on the signal statistical characteristic value of the respective discrete point.

An execution unit 6024, configured to, based on the detection threshold, perform a constant false alarm detection, and/or, determine whether the respective discrete point is subjected to interference.

It is worth mentioning that, the various modules involved in this embodiment are logic modules, and in practice, a logic unit may be a physical unit, may be a part of a physical unit, and may be realized as a combination of a plurality of physical units. In addition, in order to highlight the innovative part of the present disclosure, this embodiment does not introduce a unit that is less closely related to solving the technical problem raised in the present disclosure, but this does not indicate that other units do not exist in this embodiment.

In some embodiments, the integrated circuit may be a millimeter wave radar chip or a lidar chip (e.g., an FMCW lidar chip), etc., for obtaining information such as range, angle, speed, shape, size, surface roughness, and dielectric properties of a target. Optionally, the integrated circuit may be an Antenna-In-Package (AiP) chip structure, an Antenna-On-Package (AoP) chip structure or an Antenna-On-Chip (AoC) chip structure, and the like.

In an embodiment, different integrated circuits (e.g., chips) may be combined with each other for use in forming a cascade structure, which will not go into details herein for the sake of description, but it should be understood that the technology of which a person skilled in the art should be aware based on what is documented herein should be encompassed by what is documented herein.

Another embodiment of the present disclosure relates to a radio device, including a carrier, the integrated circuit as described above disposed on the carrier, and an antenna, configured to transmit and receive radio signals and disposed on the carrier. The antenna may be integrated with the integrated circuit and disposed on the carrier (i.e., at this time the antenna may be an antenna set in the AiP structure or the AoC structure), and the integrated circuit and the antenna may also be discrete components, which may be connected to form a system-on-chip (SoC) structure. Herein, the carrier may be a printed circuit board (PCB), such as a development platform board, a data acquisition board, or a motherboard of a device, etc., and a first transmission line may be a PCB wiring.

In some embodiments, the present disclosure further provides a terminal, including a device body, and a radio device as set forth in any one of the above embodiments disposed on the device body, where the radio device may be used to realize functions such as target detection and/or wireless communication.

Specifically, on the basis of the above embodiments, in some optional embodiments of the present disclosure, the radio device may be disposed outside of the device body or disposed inside of the device body, and in other optional embodiments of the present disclosure, the radio device may be disposed partly inside of the device body and partly outside of the device body. The embodiments of the present disclosure are not limited in this regard, as the case may be.

In some optional embodiments, the device body as described above may be components and products applied in fields such as smart cities, smart houses, transportation, smart homes, consumer electronics, security monitoring, industrial automation, in-cabin detection (e.g., smart cockpits), medical devices, and health care. For example, the device body may be a smart transportation device (e.g., a car, a bicycle, a motorcycle, a ship, a subway, a train, etc.), a security device (e.g., a camera), a liquid level/flow rate detection device, a smart wearable device (e.g., a bracelet, eyeglasses, etc.), a smart home device (e.g., a sweeping robot, a door lock, a television, an air-conditioner, a smart light, etc.), a variety of communication devices (e.g., a cell phone, a tablet computer, etc.), and such as road gates, intelligent traffic lights, intelligent signs, traffic cameras, and various industrialized robotic arms (or robots), etc., and may also be various instruments for detecting life feature parameters and various devices equipped with such instruments, such as life feature detection in automobile compartments, indoor personnel monitoring, intelligent medical devices, and consumer electronic devices.

The radio device, on the other hand, may be a radio device as set forth in any embodiment of the present disclosure, and the structure and working principle of the radio device have been described in detail in the above embodiments and will not go into details herein.

It should be noted that, the radio device may perform functions such as target detection and/or communication by transmitting and receiving radio signals to provide detection target information and/or communication information to the device body, and thereby assisting or even controlling the operation of the device body.

For example, when the device body as described above is used in an Advanced Driving Assistance System (ADAS), the radio device (e.g. millimeter-wave radar, lidar, etc.), as an in-vehicle sensor, may assist ADAS in realizing application scenarios such as adaptive cruise control, autonomous emergency braking (AEB), blind spot detection (BSD), lane change assist (LCA), rear cross traffic alert (RCTA), parking assistance, rear vehicle warning, collision avoidance, pedestrian detection, and may also be used in such application scenarios as door opening and collision avoidance for automobiles.

The various technical features of the above-described embodiments may be combined in any combination, and all possible combinations of the various technical features of the above-described embodiments have not been described for the sake of conciseness. However, as long as there is no contradiction in the combinations of these technical features, they should all be considered to be within the scope of the present specification as documented herein.

The above-described embodiments only express the preferable embodiments of the present disclosure and the technical principles utilized, and their descriptions are more specific and detailed, but they are not to be construed as limitations on the scope of the present disclosure. Various obvious changes, readjustments and substitutions can be made by a person skilled in the art without departing from the scope of protection of the present disclosure. Therefore, although the present disclosure has been described in detail by the above embodiments, the present disclosure is not limited to the above embodiments, but may include more equivalent embodiments without departing from the concept of the present disclosure, and the scope of protection of the present disclosure is set forth by the scope of the appended claims.

What is claimed is:

1. A method for interference detection and/or constant false alarm detection, comprising:

transmitting a radio signal;

receiving an echo signal related to the radio signal;

performing frequency mixing on the echo signal to obtain an intermediate frequency signal;

processing the intermediate frequency signal to obtain a discrete signal, the discrete signal including signal units, a respective signal unit of the signal units including a sequence of discrete points, wherein processing the intermediate frequency signal includes converting the intermediate frequency signal from an analog signal to a digital signal;

obtaining, for the respective signal unit, signal statistical characteristic values of the sequence of discrete points;

determining a detection threshold of the respective signal unit based on the signal statistical characteristic values of the sequence of discrete points; and based on the detection threshold, performing the constant false alarm detection and/or, determining whether any one or more discrete points in the sequence of discrete points are subjected to interference.

2. The method according to claim 1, wherein obtaining, for the respective signal unit, the signal statistical characteristic values of the sequence of the respective discrete points in the respective signal unit, includes:

obtaining a differential sequence corresponding to the respective signal unit based on signal amplitude values of the sequence of discrete points, the differential sequence including discrete points; and obtaining the signal statistical characteristic values of the sequence of discrete points based on the differential sequence.

3. The method according to claim 2, wherein obtaining the differential sequence corresponding to the respective signal unit based on the signal amplitude values of the sequence of discrete points includes:

traversing the sequence of discrete points to determine differential values corresponding to signal amplitude differences between adjacent discrete points in the sequence of discrete points; and obtaining the differential sequence based on the differential values.

4. The method according to claim 3, further comprising:

interpolating at an end of the sequence of discrete points to add a virtual discrete point; and obtaining a differential value corresponding to the end of the sequence of discrete points using a signal amplitude value of the virtual discrete point.

5. The method according to claim 2, wherein obtaining the signal statistical characteristic values of the sequence of discrete points based on the differential sequence includes:

obtaining the signal statistical characteristic values of the sequence of discrete points based on a signal statistical characteristic presented by differential values of at least some of the discrete points in the differential sequence, using an order moment as a statistical variable.

6. The method according to claim 5, wherein obtaining the signal statistical characteristic values of the sequence of discrete points based on the signal statistical characteristic presented by differential values of at least some of the discrete points in the differential sequence, using the order moment as the statistical variable, includes:

traversing the discrete points in the differential sequence and obtaining the signal statistical characteristic value of a current discrete point according to differential values of at least one discrete point prior to the current discrete point, using the order moment as the statistical variable;

wherein in response to the current discrete point being the first discrete point in the respective signal unit, differential values of at least one third virtual discrete point by means of pre-interpolating or linear fitting are obtained, and a signal statistical characteristic value of the first discrete point is obtained based on the differential values of the at least one third virtual discrete point, using the order moment as the statistical variable.

7. The method according to claim 6, wherein the signal statistical characteristic values of the sequence of discrete points are obtained based on a sliding window.

8. The method according to claim 7, wherein the sliding window has a length of L, L being an integer greater than 1, and obtaining the signal statistical characteristic values of the sequence of discrete points based on the sliding window includes:

traversing the sequence of discrete points, and obtaining the signal statistical characteristic value of the current discrete point based on differential values of L discrete points prior to the current discrete point;

or, obtaining the signal statistical characteristic value of the current discrete point based on differential values of L discrete points selected with the current discrete point as a center.

9. The method according to claim 8, wherein in response to obtaining the signal statistical characteristic value of the current discrete point based on the differential values of the L discrete points selected with the current discrete point as the center, and in response to the current discrete point being the last discrete point in the respective signal unit, differential values of at least one fourth virtual discrete point are obtained by means of post-interpolating or linear fitting to obtain the signal statistical characteristic value of the last discrete point.

10. The method according to claim 1, wherein determining whether any one or more discrete points in the sequence of discrete points are subjected to interference based on the detection threshold, includes:

traversing the sequence of discrete points and determining whether the signal statistical characteristic value of a current discrete point is greater than the detection threshold;

determining that the current discrete point is subjected to interference in response to the signal statistical characteristic value of the current discrete point being greater than the detection threshold; and determining that the current discrete point is not subjected to interference in response to the signal statistical characteristic value of the current discrete point being less than or equal to the detection threshold.

11. The method according to claim 1, wherein determining the detection threshold of the respective signal unit based on the signal statistical characteristic values of the sequence of discrete points, includes:

obtaining an average value or a median of signal statistical characteristic values of the sequence of discrete points; and taking the average value or the median as the detection threshold of the respective signal unit.

12. The signal processing-method according to claim 11, wherein the median is obtained based on histogram statistics.

13. The method according to claim 1, wherein the method further includes:

after determining whether any one or more discrete points in the sequence of discrete points are subjected to interference, determining whether a number of discrete points subjected to interference is greater than a predetermined threshold; and determining that the respective signal unit is subjected to interference in response to the number of discrete points subjected to interference being greater than the predetermined threshold.

14. The method according to claim 1, wherein the method further includes:

after determining whether any one or more discrete points in the sequence of discrete points are subjected to interference, obtaining position information of a discrete point subjected to interference in the respective signal unit; and performing one or both of:

determining whether the respective signal unit is subjected to interference based on the position information; and obtaining information of interference source based on the position information.

15. A non-transitory computer readable storage medium storing a computer program, wherein the computer program, when executed by a processor, causes the processor to implement the method according to claim 1.

16. An integrated circuit comprising:

a signal transceiver channel, configured to transmit radio signals, and to receive echo signals formed by the radio signal being reflected by a target; and a signal processing module, configured to perform signal processing based on the method according to claim 1.

17. A radio device, comprising:

a carrier;

an integrated circuit according to claim 16, disposed on the carrier;

an antenna, disposed on the carrier, and configured to transmit and receive radio signals.

18. A terminal, comprising:

a device body;

a radio device according to claim 17, disposed on the device body, configured to perform target detection and/or communication.

19. The method according to claim 1, wherein processing the intermediate frequency signal further includes performing discrete spectrum analysis on the digital signal to obtain the discrete signal.

20. A method for interference detection and/or constant false alarm detection in an analog signal, the method comprising:

obtaining a discrete signal from the analog signal, the discrete signal including signal units, a respective signal unit of the signal units including a sequence of discrete points;

obtaining, for the respective signal unit, signal statistical characteristic values for the sequence of discrete points;

determining a detection threshold of the respective signal unit based on the signal statistical characteristic values of the sequence of discrete points; and based on the detection threshold, determining whether any one or more discrete points in the sequence of discrete points indicate a constant false alarm and/or, determining whether any one or more discrete points in the sequence of discrete points are subjected to interference;

wherein obtaining, for the respective signal unit, the signal statistical characteristic values of the sequence of discrete points, includes:

obtaining a differential sequence corresponding to the respective signal unit based on signal amplitude values of the sequence of discrete points; and obtaining the signal statistical characteristic values of the sequence of discrete points based on the differential sequence.

21. A method for interference detection and/or constant false alarm detection on a discrete signal, the discrete signal including signal units, the method comprising:

selecting a respective signal unit of the signal units for interference detection and/or constant false alarm detection, the respective signal unit being a chirp signal and including a sequence of discrete points;

obtaining, for the respective signal unit, signal statistical characteristic values of the sequence of discrete points; wherein the signal statistical characteristic values are configured to characterize local mutation of the chirp signal;

determining a detection threshold of the respective signal unit based on the signal statistical characteristic values of the sequence of discrete points; and based on the detection threshold, determining whether any one or more discrete points in the sequence of discrete points indicate a constant false alarm and/or, determining whether any one or more discrete points in the sequence of discrete points are subjected to interference.

* * * * *